United States Patent
Heidjann et al.

Patent Number: 6,152,820
Date of Patent: Nov. 28, 2000

[54] CHOPPING DEVICE IN A COMBINE

[75] Inventors: Franz Heidjann; Alfons Roberg, both of Harsewinkel, Germany

[73] Assignee: CLAAS Selbstfahrende Erntemaschinen GmbH, Harsewinkel, Germany

[21] Appl. No.: 09/086,867

[22] Filed: May 29, 1998

[30] Foreign Application Priority Data

May 30, 1997 [DE] Germany .......................... 197 22 793

[51] Int. Cl.$^7$ .................................................. A01F 12/40
[52] U.S. Cl. .............................. 460/112; 460/73; 460/80; 460/69
[58] Field of Search ............................. 460/78, 111, 112, 460/113, 119, 142, 69, 73, 80

[56] References Cited

U.S. PATENT DOCUMENTS

| Re. 31,257 | 5/1983 | Glaser et al. | 460/80 |
|---|---|---|---|
| 4,342,319 | 8/1982 | Willis et al. | 130/27 |
| 4,484,587 | 11/1984 | Raineri | 460/78 |
| 5,445,563 | 8/1995 | Stickler et al. | 460/69 |
| 5,556,042 | 9/1996 | Roberg | 241/101.76 |
| 5,688,170 | 11/1997 | Pfeiffer et al. | 460/69 |
| 5,769,711 | 6/1998 | Roberg | 460/73 |
| 5,833,533 | 11/1998 | Roberg | 460/112 |
| 5,913,724 | 6/1999 | Roberg | 460/112 |
| 5,928,079 | 7/1999 | Roberg | 460/113 |
| 6,027,407 | 2/2000 | Roberg | 460/80 |

FOREIGN PATENT DOCUMENTS

| 0 124 628 A1 | 5/1983 | European Pat. Off. | A01F 12/18 |
|---|---|---|---|
| 727 496 | 11/1942 | Germany . | |
| 23 30 164 | 1/1980 | Germany | A01F 12/18 |
| 31 40 143 A1 | 4/1983 | Germany | A01F 12/28 |
| 33 19 138 A1 | 12/1983 | Germany | A01F 12/18 |
| 196 00 390 A1 | 12/1996 | Germany | A01D 41/00 |

*Primary Examiner*—David Bagnell
*Assistant Examiner*—Meredith C. Petravick
*Attorney, Agent, or Firm*—Husch & Eppenberger, LLC; Robert E. Muir

[57] ABSTRACT

A combine includes a housing enclosing a rotary separator. The rotary separator's discharge area is built such that the quality of the chopped crops is improved and a continuous discharge of crops is guaranteed. Guiding devices in the area of the axial-flow chopping device and on the inside of the housing's cover are designed such that the half of the guiding devices which are located in front of the chopping knives are essentially perpendicular to the pivotal axis of the rotary separator. In the area of the chopping knives, the housing is designed as a swiveling shutter so that the annular gap, located between the rotary separator and the housing, can be narrowed by the swiveling shutter.

19 Claims, 6 Drawing Sheets

CHOPPING DEVICE IN A COMBINE

BACKGROUND OF THE INVENTION

The present invention relates generally to agricultural machinery and, more particularly, to improvements to combines for harvesting agricultural crops.

Combines for harvesting agricultural crops generally have a mowing platform or cutterbar and a threshing cylinder which is connected in the crop-flowing direction to at least one separation device. The separation device may operate on an axial flow principle. The separation device is situated in an annular gap between the separation rotor and the combine's housing and is equipped with a rotating drive separation rotor and a plurality of chopping knives that extend into the separation device. The separation rotor is enclosed by a cover, which has a radial cut-out section at the crop flow discharge end and is equipped with a guiding device which is mounted on the interior of the cover's top cover and is assigned to the separation rotor's vanes.

A combine of this type is disclosed in European Patent 96 107 457.2 A1. The feeding elements of each separation rotor are designed in a spiral-, helical-, or screw-type fashion around the cylindrical base body. The cover's fixed guiding devices are built like paths and are designed with a gradient, which is matched to the separation rotor vanes. Because the chopping knives are mounted on a carrying axle, which is parallel to the rotational axis of the separation rotor, the guiding devices in the area of the axial-flow chopping unit are installed in a sharp angle to the chopping knives. This is not an optimal arrangement for the chopping action because the crops to be chopped run through the working area of the chopping device too quickly. In addition, in the prior art, the axial-flow chopping device is located at a distance from the back discharge end of the separation rotor. This location is unsuitable for repair and maintenance work. Furthermore, with this location a continuous discharge of the chopped crops cannot be guaranteed.

It is desirable to provide a combine of the aforementioned type that produces a higher quality of the chopped crops compared to the prior art and provides a continuous discharge of chopped crops.

SUMMARY OF THE INVENTION

It is an object of the present invention to provide a combine with an improved chopping device that overcomes one or more of the above described deficiencies.

An object of this invention is to introduce an axial-flow chopping device with crop distributing end which reaches into the radial cut-out area of the cover's discharge opening and whose crop pick-up end forms a partial area of the annular closed rotor cover encompassing at least one chopping knife.

In accordance with the present invention there is provided a combine for harvesting agricultural crops and having a cutterbar; a threshing mechanism; at least one axial-flow separation device equipped with a separation rotor having vanes; a plurality of chopping knives movable into the separation device; a housing enclosing the separation rotor and having a discharge opening at the crop flow discharge end; a guiding device at the inside of the cover and cooperating with the separation rotor's vanes; and an axial-flow chopping device having a crop distributing end at the discharge opening and a crop pick-up end forming a partial area of the housing encompassing at least one chopping knife.

The cover's guiding devices, which are located in the rear of the chopping knife group, relative to the flowing direction of the chopped crops, show a declining gradient in the rotor's rotating direction so that each area of the cover's guiding devices directly in front of the chopping knife group stands vertically or at least approximately vertically to the rotational axis or the rotor. The cover's guiding devices are positioned so that the crops essentially stand vertically against the chopping knives when they are fed by the rotor's vanes. Optimum conditions for the chopping action are created so that, depending on the distance between the chopping knives, the chopped crops are extremely short. This by itself guarantees a continuous discharge of chopped crops. Thus, It is then sufficient for the rear guiding devices, relative to the flowing direction of the chopped crops, to show a declining gradient because the separation rotor guarantees a continuous conveyance of crops to be chopped. The cover's guiding devices are designed in such a way that the half of the housing allocated to the chopping knives stands vertically or approximately vertically to the rotational axis of the rotor.

Another object is to provide a combine with a guiding device area which is allocated to the chopping knife group, applied to the flow direction of the chopped crops, and is subdivided into a front area with a constant gradient and a rear area where the guiding device area facing the chopping knives stands approximately vertically to the rotational axis of the rotor. In addition, the area turned away from the chopping knife group is accordingly designed in a spiral-, helical-, or screw-type fashion similar to the guiding devices located in front of it. The areas which stand in a vertical or approximately vertical position to the rotational axis of the rotor cause a reduction of the axial feeding in the radial discharge area. An optimum quality of the chopped crops results when the length of the rear area is twice as long or approximately double the size of the front area.

Additionally, the quality of the chopped goods will be improved when the annular gap is narrowed in the rotor's rotating direction in the area of the chopping knife group. The result is a compression of the crops to be chopped, thus improving the cutting action as the radial slots of the rotor vanes run past the chopping knives. The annular gap should be narrowed from the housing towards the separation rotor so that the crops to be chopped will be pressed toward the separation rotor. To achieve this, the housing area allocated to the chopping knife group is designed as a contour-like pivotal shutter, which is firmly mounted on a swiveling axis, parallel to the axis of the chopping knives=support shaft. The shutter can be swiveled into different positions. In normal situations, control of the swivel drive occurs from the control unit which is mounted in the operator cabin. Additionally, the operator can increase the annular gap when necessary to eliminate clogging. A simple solution can be accomplished by designing a shutter, which is arranged in bearing plates outside the housing, with bolts to be used as the swiveling axis and two pivotal levers mounted firmly on the bolts which can be swiveled into a position outside the housing by a driving lever via draw bar against the force of a spring. The two pivotal levers can be connected via cross arm and the draw bar can be connected with the cross bar. A linear drive, preferably a hydraulic cylinder, is connected to the driving lever. A spring, preferably a pressure spring, is placed over the draw bar and pushes the shutter towards the separation rotor. With increased resistance, the shutter can deflect to increase the annular gap. For example, in the event foreign matters clog the combine, the chopping knives should be swiveled outside the annular gap. The present invention is designed so that the centering shaft for the chopping knives is connected to the swiveling shutter and the chopping knife holders are firmly connected with the shutter. In its simplest design, this knife holder is, for example, a continuous profile rail, preferably with a U-shaped cross section. Provided the straw does not have to be chopped, the shutter together with the chopping knives can be swiveled to the idle position, thus ensuring that the chopping knives and the shutter, on an as-needed basis, deflect independently from each other against the spring force. However, the swiveling of the chopping position into the idle position and back can occur with only one linear drive. Therefore, the present invention is alternatively designed so that the chopping knives are connected to a lever system, to which a second draw bar is joint, which is synchronously movable with the first draw bar, so that the chopping knives and the shutter can be swiveled independently from each other against the effects of the pressure spring without actuating a linear drive acting on the draw bar. The continuous discharge of chopped crops is best accomplished when the axial-flow chopping device is located in the rear of the separation rotor, relative to the flowing direction of the chopped goods.

BRIEF DESCRIPTION OF THE DRAWINGS

Reference is now made to the drawings which illustrate the best known mode of carrying out the invention and wherein the same reference numerals indicate the same or similar parts throughout the several views.

DETAILED DESCRIPTION

Figure 1:
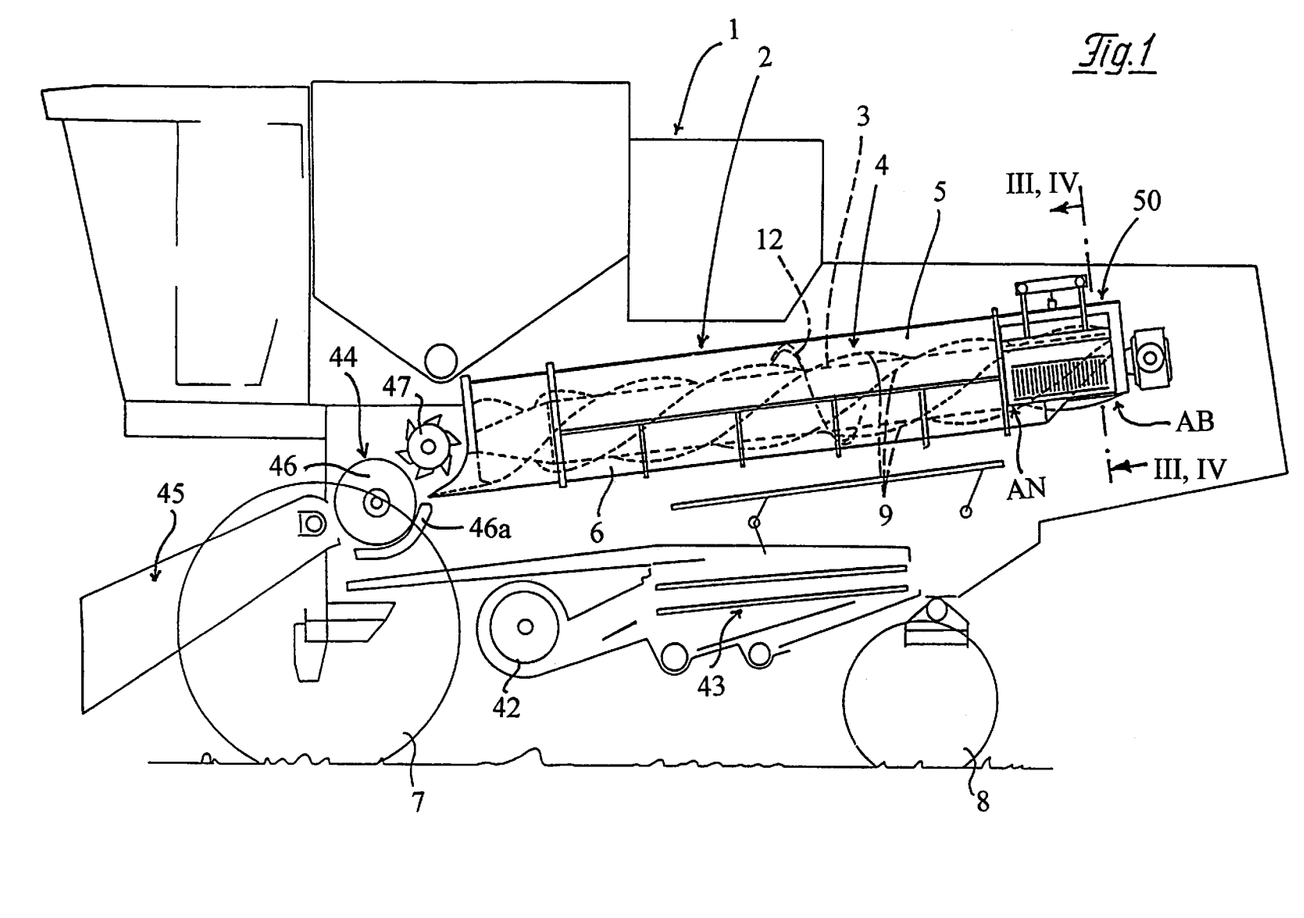
FIG. 1 is an elevational view of a combine incorporating an embodiment of the invention.

A combine 1 is shown in FIG. 1 and is designed as a self-propelled combine equipped with a separation device 2 whose operation applies the axial-flow principle. This separation device 2 includes a rotationally-driven rotary separator 3 covered by a housing 4 which has an upper half in the form of a imperforate cover 5 and a bottom half in the form of a perforate separating grate 6. In this example, the axis 14 (see FIGS. 3 and 4) of the rotary separator 3 is located crosswise to the pair of wheels 7 and 8 of the combine 1; i.e. generally parallel to the combine's longitudinal axis. As a result, the feeding direction of the rotary separator 3 is opposite the forward driving movement of the combine 1. In addition, the rotary separator 3 has helical vanes 9, conveniently four in number, which comprise the feeding devices. The vanes 9 and are spirally-mounted around a basic cylindrical body 10 (see FIGS. 3 and 4) to form a rotor.

Figure 2:
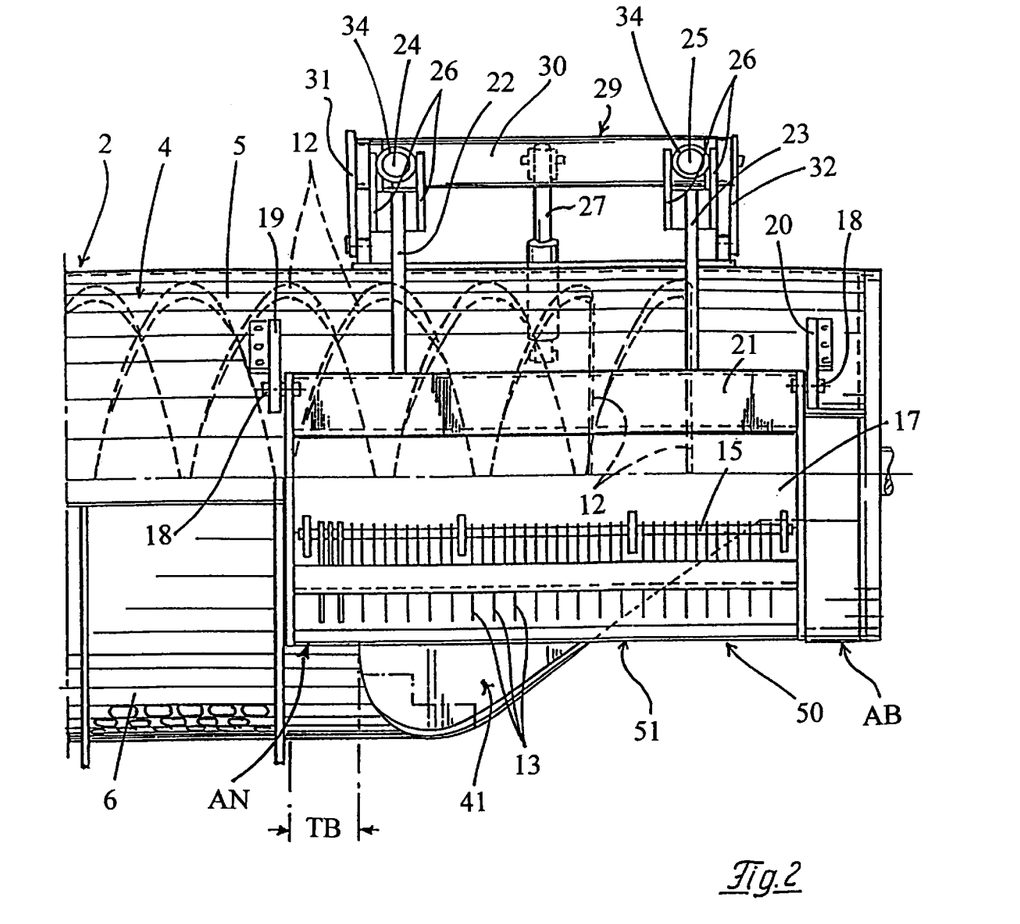
FIG. 2 is a side elevation of the axial-flow chopping device at the rear area of the separation rotor.
Figure 3:
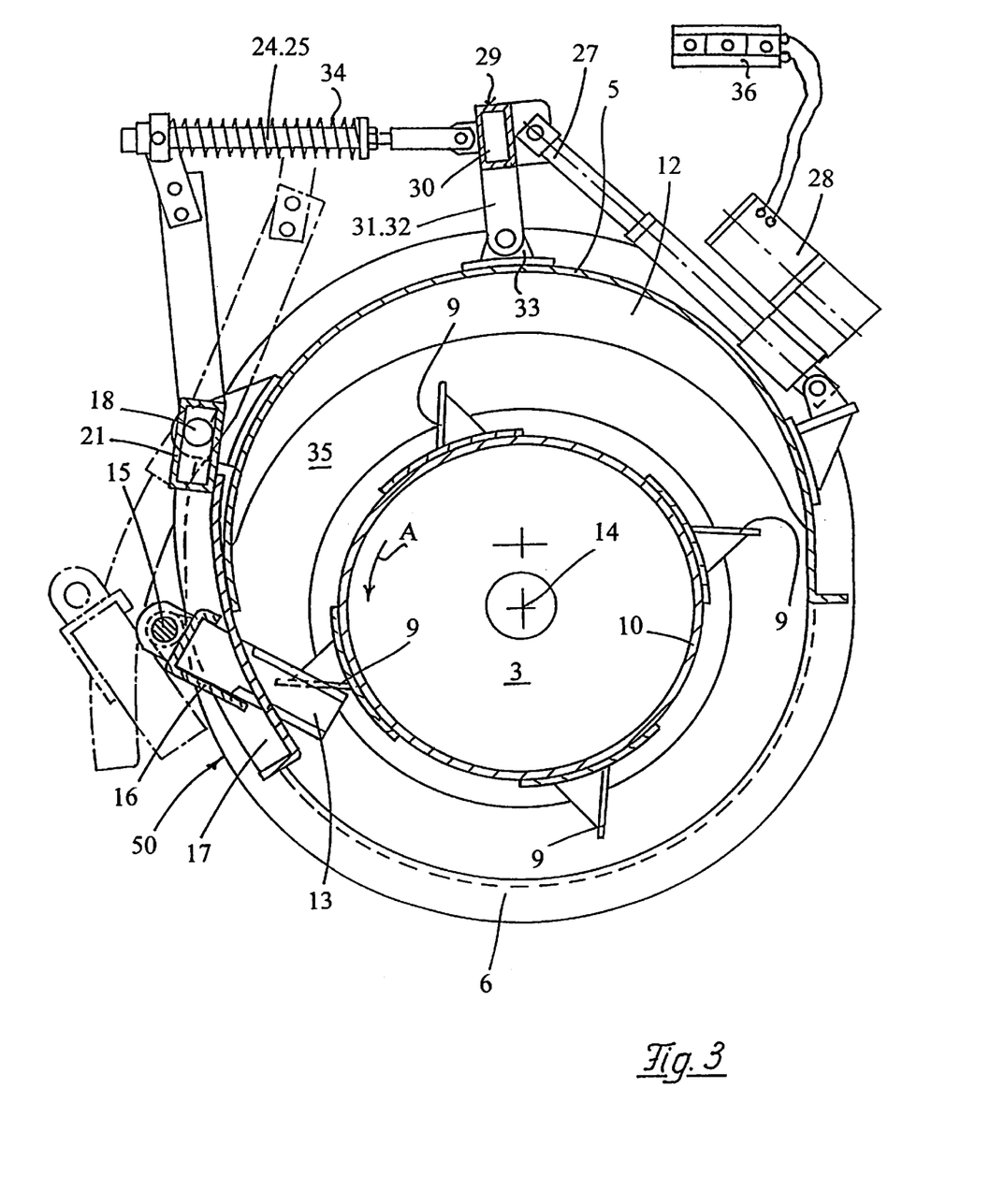
FIG. 3 is a cross-sectional view taken along line III—III of FIG. 1 and showing a first embodiment.
Figure 4:
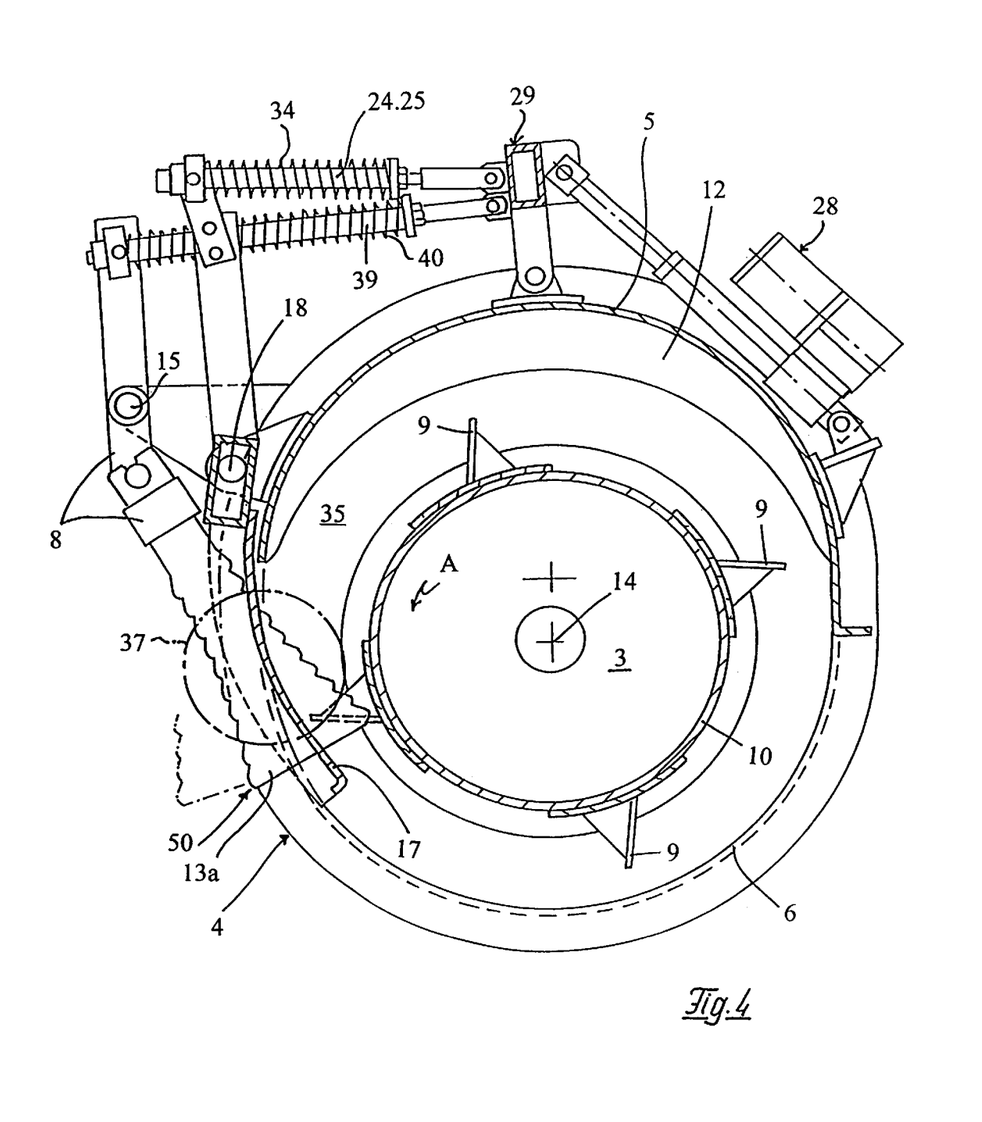
FIG. 4 is a cross-sectional view taken along the line IV—IV of FIG. 1 and showing a second embodiment.

At the rear area or discharge end of the rotary separator 3, the rotor and the corresponding section of the housing 4 are constructed and arranged to provide an axial-flow chopping device 50 having a crop distributing end AB and a crop pick-up end AN forming a partial area TB of the annular cover or housing 4. For this purpose, the vanes 9 include equally spaced radial slots 11 (see FIG. 6), which have an open design facing opposite to the rotational axis 14 of rotary separator 3. FIG. 2 shows a multitude of guiding devices or guides 12 mounted on the inside of the cover 5. The guides 12 cooperate with the helical vanes 9 and, hence, run at a corresponding angle or gradient. The guiding devices 12 are simple webs. Two different embodiments of chopping knives 13, 13a are shown in FIGS. 3 and 4. As shown in FIG. 2, a row of the chopping knives 13 are mounted on a support shaft 15 spaced from and generally parallel to the axis 14. Additionally, the chopping knives 13 are carried by a U-shaped knife holder 16. In the area of the chopping knives 13, the housing 4 is designed with a swiveling shutter 17. The swiveling axis 18 for the shutter 17 is located above and parallel to the support shaft 15. FIG. 2 shows only the back end of the separation device 2, but indicates that the guiding devices 12 on the housing 4 have a constant gradient also in the front area. This gradient is constant up to the intake area of the chipping knife 13. At the rear of the axial-flow chopping device 50, the gradient of the guiding devices 12 decreases in the turning direction of the rotor, indicated by arrow A in FIGS. 3, 4 and 6. In the example shown in FIG. 2, the areas of guiding devices 12 which cooperate with the chopping knives 13 are perpendicular to the axis 14 of the rotary separator 3 and to the support axis 15 for the chopping knives 13.

As shown in FIG. 2, the swiveling axis 18 is mounted by bolts in bearing plates 19 and 20. Referring to FIGS. 2–4 but especially FIG. 3, at its upper end the shutter 17 is equipped with a cross tube 21 whose ends are connected to the swiveling axis 1 8. Two lever arms 22 and 23 are connected to this cross tube 21. The free end of each lever arm 22 and 23 acts upon one draw bar 24 and 25, which has one end in brackets 26. The draw bars 24 and 25 are connected to a connecting rod 27 of a linear drive unit or cylinder 28, which is supported on the cover 5, and conveniently located opposite the swiveling axis 18. A swing bridge 29 serves as a connection piece between the ends of the draw bars 24 and 25 and the connecting rod 27. This swing bridge comprises a cross arm 30 with brackets 31, 32 on each of its ends which are pivotally supported in bearing bases 33 on the outside of the cover 5. The draw bars 24 and 25 are telescopically arranged and are spring-mounted between brackets 26 and the swing bridge 29. With the assistance of compression springs 34, the shutter 17 is swiveled into the chopping position as shown in FIG. 3. This advantageous arrangement narrows the annular gap 35 between the rotary separator 3 and the housing 4 in the area above the chopping knives 13. This chopping position of the shutter 17 allows the vanes 9 of the rotary separator 3 to pass the shutter 17 at a minimal distance. Because the U-shaped knife holder 16 and the support axis 15 are firmly connected with the shutter 17, the shutter 17 together with the chopping knives 13 will be swiveled into the position as shown by the phantom lines in FIG. 3. This occurs when the force resulting from the crops to be chopped is so great that the springs 34 are compressed. Simultaneously, the linear drive unit 28 can be controlled from the central control unit 36 to swivel the shutter 17 and the chopping knives 13 into or out of the operating position.

The embodiment in FIG. 4 differs from the one in FIG. 3 in that the chopping knives 13a and shutter 17 are jointly swiveled into the operating position; more specifically, into the idle position by the linear drive unit 28. Additionally, the chopping knives 13a and the shutter 17 can independently be moved if, for example, required by the pressure originating from the crops to be chopped. The chopping knives 13a do not have to be blades, but also may be circular knives 37 as shown in a phantom line in FIG. 4. The chopping knives 13, 13a or the circular knives 37 respectively can be mounted on a lever device 38, whereby the pivotal point is axis 15. An additional draw bar 39, also surrounded by a compression spring 40, acts upon a lever device 38. The other end of draw bar 39 is hinged to the swing bridge 29. The force created by pressure springs 34 and 40 can be different so that, for example, the chopping knives 13a or circular knives 37, can move out of the way if they have a lower crop pressure than the shutter 17, and vice-versa.

Figure 5:
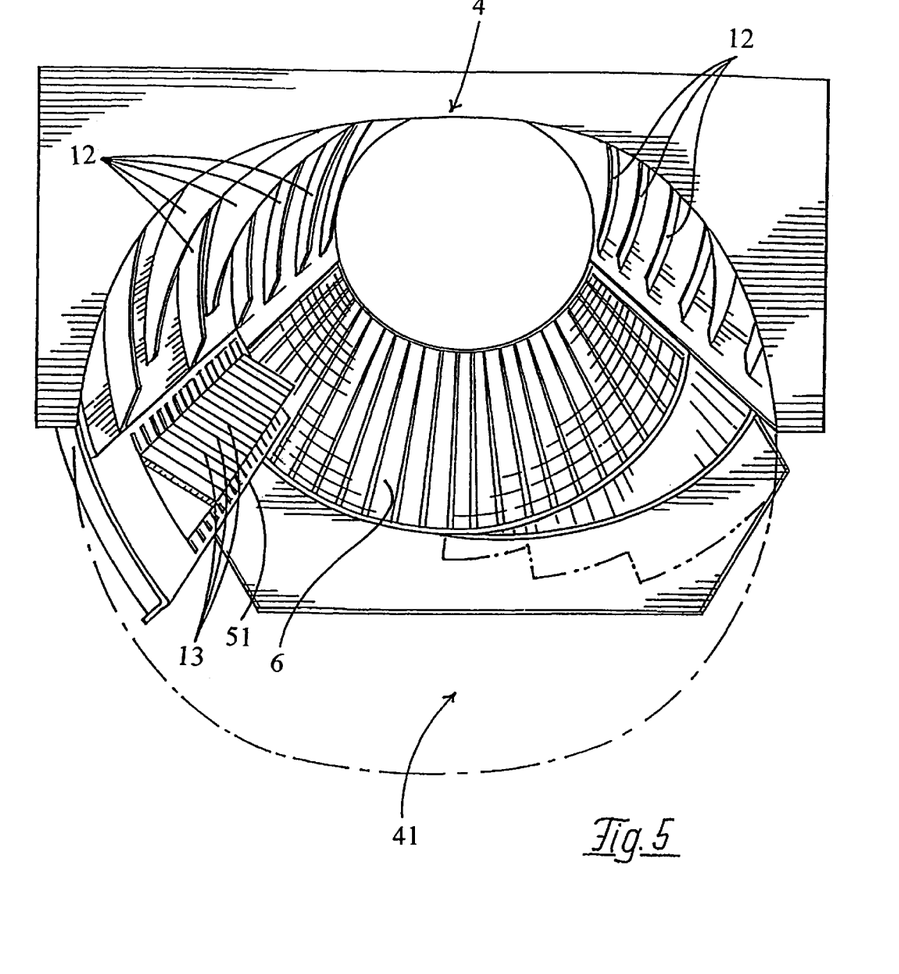
FIG. 5 is a back end view looking into the separation rotor housing, viewed in the direction opposite to the flow of the chopped crops.
Figure 6:
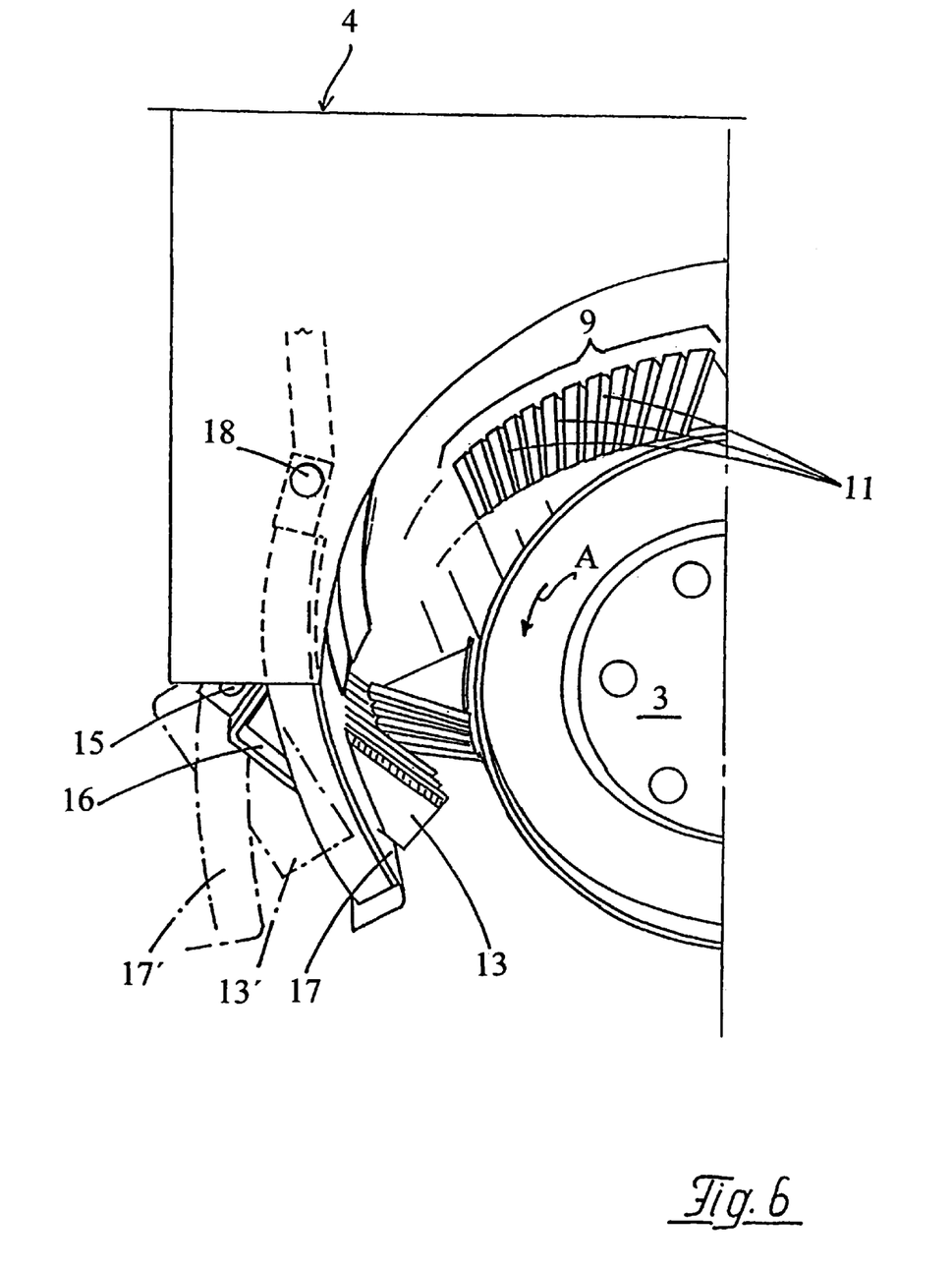
FIG. 6 is a partial back end view of the separation rotor, showing the engagement of the separation rotor's vanes with the chopping knives.

The turning direction of the rotary separator 3 is shown in FIGS. 3, 4, and 6 by the arrow A. Regarding the turning direction A, FIGS. 2 and 5 show that, in the turning area in front of the chopping knives 13, the guiding devices 12 on the housing 4 run perpendicularly to the pivotal axis 14 of the rotary separator 3. Furthermore, the guiding devices 12 end directly in front of the chopping knives 13. To simplify the drawing, the rotary separator 3 is not shown in FIG. 5. FIGS. 2 and 5 also show that the wedge-shaped discharge opening 41 for the chopped crops adjoins and is immediately rear of the separating grates 6. The wedge-shaped discharge opening has a boundary or restricting edge 51 (see FIG. 2) which is parallel to the rotor axis 14. A distributing device such as a rotary spreader (not shown) may be located below this discharge opening 41.

FIG. 6 shows that the vanes 9 are constructed in a spiral-, helical-, or screw-type manner around the cylindrical base body 10 of rotary separator 3. The radial slots 11 are arranged and positioned so that in the area of the chopping knives 13, the chopping knives 13 extend momentarily into the radial slots 11 without touching. The chopping action can be a continuous process, resulting in high chopping quality. The special form of the guiding devices 12 above the chopping knives 13 is emphasized by the fact that the crops to be chopped lay or extend crosswise of the chopping knives 13. FIG. 6 shows, in solid lines, the 10 chopping position of the shutter 17 and the chopping knives 13. The rotated idle or retracted position is symbolized by the broken lines 13' and 17' which are either moved into place through swiveling into the idle position or through increased pressure on the crops to be chopped.

In the practical example, the vanes 9 are interrupted by the radial slots 11 in the area of the axial-flow chopping device 50. They could also be limited by plate-shaped devices (not shown) connected to the base body 10 of the rotary separator 3 in any desired manner.

The combine 1 is conveniently equipped with a cleaning fan 42 and a cleaning shoe, which are both located underneath the rotary separator 3. In addition, the combine 1 is equipped with a feeder conveyor or elevator 45 and a threshing mechanism 44, both well-known in the art. In the practical example, the threshing mechanism 44 includes a threshing cylinder 46 and a concave 46a. An impeller or transfer cylinder 47 is positioned directly before the loading end of the rotary separator's 3 turning axis. The present invention can also be used in combines whose threshing mechanism works according to the axial principle or whose threshing mechanism includes several cylinders. In another embodiment of the invention, the rotary separator 3 can be mounted crosswise of the combine 1. In addition to the practical example shown in the drawings, the combine 1 can also be equipped with several separation devices 2 and a corresponding number of rotary separators 3.

Other objects, features and advantages will be apparent to those skilled in the art. While preferred embodiments of the present invention have been illustrated and described, this has been by way of illustration and the invention should not be limited except as required by the scope of the appended claims.

We claim:

1. A combine for harvesting agricultural crops and having a cutterbar; a threshing mechanism; at least one axial-flow separation device equipped with a rotary separator located rearwardly of the threshing mechanism and having vanes; a plurality of chopping knives movable into the separation device; a housing enclosing the rotary separator and having a discharge opening at a crop flow discharge end remote from the threshing mechanism; a guiding device at the inside of the housing and cooperating with the rotary separator's vanes; an axial-flow chopping device having a crop distributing end at the discharge opening and a crop pick-up end forming a partial area of the housing and encompassing at least one chopping knife; and wherein said housing has a guiding device located in a rear area of the chopping knives and having a decreasing gradient in a turning direction of the rotary separator.

2. A combine according to claim 1, wherein the rotor has a pivoting axis and said housing includes a radial course of a wedge-shaped cut-out area forming the discharge opening, the cut-out area having a boundary parallel to the rotor pivoting axis.

3. A combine according to claim 1, wherein the area of said guiding device assigned to the chopping knives is generally perpendicular to the pivoting axis of the rotary separator.

4. A combine according to claim 1, wherein said guiding device area assigned to the chopping knives, as seen in the crop flowing direction, has a front area with a constant radius and a rear area in which the guiding device area facing the chopping knives is generally perpendicular to the pivoting axis of the rotor.

5. A combine according to claim 4, wherein the length of the rear area is approximately double the length of the front area.

6. A combine for harvesting agricultural crops and having a cutterbar; a threshing mechanism; at least one axial-flow separation device equipped with a rotary separator located rearwardly of the threshing mechanism and having vanes; a plurality of chopping knives movable into the separation device; a housing enclosing the rotary separator and having a discharge opening at a crop flow discharge end remote from the threshing mechanism; a guiding device at the inside of the housing and cooperating with the rotary separator's vanes; an axial-flow chopping device having a crop distributing end at the discharge opening and a crop pick-up end forming a partial area of the housing and encompassing at least one chopping knife; and wherein said guiding device is situated in an annular gap between the rotary separator and the housing.

7. A combine according to claim 6, wherein said the annular gap between the rotary separator and the housing is narrower in the rear area, in front of the chopping knives.

8. A combine for harvesting agricultural crops according to claim 6, wherein the annular gap between the rotary separator and the housing can be widened for discharge.

9. A combine according to claim 6, wherein the portion of said housing assigned to the chopping knives is a contour-shaped shutter connected to a swiveling axis.

10. A combine according to claim 9, wherein said swiveling axis is parallel to the support axis of the chopping knives.

11. A combine according to claim 9, including a swivel drive for imparting a swiveling action to the swiveling axis.

12. A combine according to claim 9, including means for mounting the shutter on said swiveling axis.

13. A combine according to claim 12, including a draw bar, a driven lever operatively connected to the shutter and the draw bar and operable against a spring force to move the shutter to a position outside the housing.

14. A combine according to claim 12, wherein the support axis for the chopping knives is mounted on the shutter.

15. A combine according to claim 12, including a knife holder for the chopping knives, and wherein the knife holder is connected to said shutter.

16. A combine according to claim 13, including a lever device, and wherein said chopping knives are connected to the lever device.

17. A combine according to claim 16, including a second draw bar hinged to said lever device.

18. A combine according to claim 17, including means for moving said second draw bar synchronously with the first draw bar so that the chopping knives are swiveled independently against spring force without engagement of a liner drive unit, which acts upon the draw bar.

19. A combine for harvesting agricultural crops and having a cutterbar; a threshing mechanism; at least one axial-flow separation device equipped with a rotary separator located rearwardly of the threshing mechanism and having vanes; a plurality of chopping knives movable into the separation device; a housing enclosing the rotary separator and having a discharge opening at a crop flow discharge end remote from the threshing mechanism; a guiding device at the inside of the housing and cooperating with the rotary separator's vanes; an axial-flow chopping device having a crop distributing end at the discharge opening and a crop pick-up end forming a partial area of the housing and encompassing at least one chopping knife; and wherein said axial-flow chopping device includes cooperating radial slots and is located at the rear of the rotary separator.

* * * * *